United States Patent [19]

Okada et al.

[11] Patent Number: 5,011,250
[45] Date of Patent: Apr. 30, 1991

[54] OPTICAL HARMONIC GENERATOR

[75] Inventors: Yoshio Okada, Saitama; Toshihiko Takano, Kashiwa, both of Japan

[73] Assignee: Sharp Kabushiki Kaisha, Osaka, Japan

[21] Appl. No.: 367,128

[22] Filed: Jun. 16, 1989

[30] Foreign Application Priority Data

Jun. 16, 1988 [JP] Japan ................................. 63-148529

[51] Int. Cl.$^5$ .............................................. G02F 1/37
[52] U.S. Cl. .................................. 350/96.12; 307/427; 307/430
[58] Field of Search ............... 350/96.12, 96.19, 96.29; 307/425, 426, 427, 428, 429, 430

[56] References Cited

U.S. PATENT DOCUMENTS

| 4,583,818 | 4/1986  | Chen et al. ........................ 350/96.19 |
| 4,780,543 | 10/1988 | Gordon et al. ............... 350/96.12 X |
| 4,804,747 | 2/1989  | Allen et al. ................... 350/96.12 X |
| 4,828,758 | 5/1989  | Gillberg-LaForce et al ... 307/425 X |
| 5,867,510 | 9/1989  | Dobson ................................ 307/427 |

OTHER PUBLICATIONS

"Enhancement of the Second Harmonic Generation at the Silver Surfaces with Surface Plasmons", vol. 29, No. 9, Sep. 1984, Kexue Tongbao.
"JOSA Communications", vol. 1, No. 2/Apr. 1984/J. Opt. Soc Am. B, pp. 317-319, J. C. Quail et al.

Primary Examiner—John D. Lee

[57] ABSTRACT

An optical harmonic generator for obtaining a harmonic with a wavelength which is an integral measure of the wavelength of incident light by the use of a nonlinear optical effect is provided which is used, for example, to obtain a laser beam having a shorter wavelength. The optical harmonic generator is formed by laminating a dielectric, a metal thin film, and a nonlinear thin film waveguide. A very strong alternating electric field, produced by the electric field enhancement effect of a metal surface plasmon excited by the metal thin film, is applied near the interface between the nonlinear thin film waveguide and the metal thin film, and a harmonic is generated from the nonlinear thin film waveguide by the alternating electric field. By selecting the film thickness of the metal thin film and the depth of the nonlinear thin film waveguide, phase matching between the incident light and the generated harmonic is achieved.

12 Claims, 2 Drawing Sheets

OPTICAL HARMONIC GENERATOR

BACKGROUND OF THE INVENTION

The present invention relates to an optical harmonic generator for converting incident light (hereinafter referred to as fundamental wave) to light with a wavelength which is an integral measure of the wavelength of the incident light (hereinafter referred to as harmonic) by means of a nonlinear optical effect, wherein phase matching between the fundamental wave and the generated harmonic, which is necessary to the efficient harmonic generation is achieved by a novel structure.

As conventional technique for wavelength conversion by means of the nonlinear optical effect, gas lasers or solid state lasers have been experimentally employed in such a manner that the light therefrom is used as a fundamental wave to obtain harmonics. In actuality, apparatuses of this type have been put to practical use.

The apparatuses presently used are, however, poor in conversion efficiency, and large in size and thus not very portable. In addition, the apparatuses presently used are expensive and therefore used only in limited institutions, such as factories, universities, and laboratories.

Semiconductor lasers, on the other hand, have superior advantages, for example, small size, lightweight, high-efficiency, long service life, and low price, and experimental work has been pursued to obtain a harmonic using the light of a semiconductor laser as the fundamental wave. However, the light intensity of semiconductor lasers is not sufficiently strong and low in the harmonic generation efficiency and therefore has not been as yet put to practical use.

To obtain the prominent harmonic generation efficiency, it is necessary to maintain the phase matching between the fundamental wave and the generated harmonic. If the fundamental wave and the harmonic are not matched in phase, they are canceled out because the harmonic is generated at various points where the fundamental wave is propagated.

In conventional apparatuses for performing wavelength conversion by means of the nonlinear optical effect, several techniques have been employed to obtain phase matching between the fundamental wave and harmonic, such as (1) a technique utilizing birefringence of a nonlinear optical crystal, and (2) a technique utilizing the difference of dispersion between the fundamental wave and harmonic propagated through a waveguide according to propagation modes, caused depending on the waveguide structure (disclosed, e.g., in *OYO BUTSURI*, vol. 56, No. 12 (1987), pp. (49–53).

For the former technique, however, it is essential to use a material which meets the phase matching conditions (Type I and Type II phase matching conditions) determined by the nonlinear susceptibility and birefringent index of the crystal. Moreover, it is necessary to use a bulk single crystal of a nonlinear optical material, and strictly adjust the direction and polarization of incident light and the axis of the crystal. Further, precise temperature control is required to eliminate the dependence of the refractive index on temperature. This method is used to achieve the phase matching in an SHG unit for a high-power laser. However, this unit is large-sized and expensive, and, if used as an SHG unit for a semiconductor laser, the advantages of the semiconductor laser, i.e., small size, lightweight, low price, etc., are not available.

As for the latter technique utilizing the dispersion difference, it is very difficult to produce a waveguide having dimensions coincident with the theory, with satisfactory reproducibility.

SUMMARY OF THE INVENTION

An object of the present invention is to provide an optical harmonic generator which is capable of achieving phase matching between a fundamental wave and a harmonic on the basis of an entirely new optical principle and which has high conversion efficiency that is not achieved by a conventional optical harmonic generator.

According to the present invention, an optical harmonic generator comprises an optical component for emitting light having a propagation constant greater than that of incident light, a metal thin film in which a surface plasmon is excited by the light emitted from the optical component and having a greater propagation constant, and a waveguide including a nonlinear optical thin film for emitting, from an end face thereof, light with a wavelength which is an integral measure of a wavelength of the incident light, by the surface plasmon of the metal thin film.

By selecting the film thickness of the metal thin film and the depth of the nonlinear thin film waveguide, phase matching between the incident light and the generated harmonic is achieved.

DETAILED DESCRIPTION OF THE INVENTION

An optical harmonic generator according to an embodiment of the present invention will now be described with reference to the drawings.

The following description is directed only to the second harmonic, but it should be noted that the description applies also to other harmonics.

It is also noted that the nonlinear optical material is not limited to a specific material. Any materials that meet the phase matching conditions described hereinafter can be used for the element of the present invention.

Figure 1:
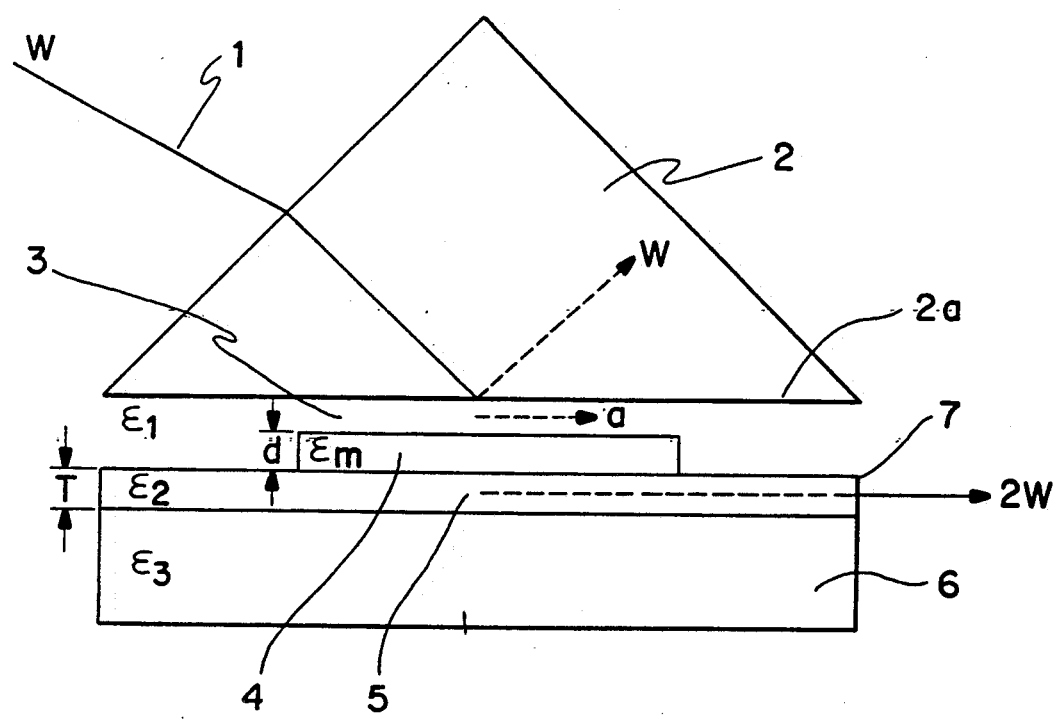
FIG. 1 is a depiction showing a structure of an optical harmonic generator according to one embodiment of the invention.

FIG. 1 is a partly sectional view showing the structure of an optical harmonic generator according to the embodiment of the invention.

In the figure, reference numeral 1 denotes a P-polarized laser beam as a fundamental light wave, 2 a prism for propagation constant adjustment, 3 a first dielectric, 4 a metal thin film, 5 a nonlinear optical thin film waveguide, and 6 a second dielectric.

The principle of generation of a harmonic employed in the element of the present invention will be briefly explained.

If the P-polarized fundamental wave 1 is made incident to a bottom surface 2a of the prism 2 at an angle greater than the critical angle determined by the refractive indices of the prism and the dielectric 3, light called the evanescent wave permeates in the layer of the dielectric 3 beneath the underside of the prism 2. Whe the wave number of the evanescent wave coincides with the propagation constant of a metal surface plasmon (the quantum of the excited metal surface plasma oscillation) which is determined chiefly by the refractive index of the metal thin film 4 and the film thickness d and refractive index of the nonlinear optical thin film waveguide 5, the metal surface plasmon is strongly excited.

At this time, a very strong alternating electric field produced by the electric field enhancement effect of the metal surface plasmon (the effect that an electric field whose intensity is several tens of times that of the incident light is generated at the metal-dielectric interface) is applied in the vicinity of the interface between the nonlinear optical thin film waveguide 5 and the metal thin film 4. By this alternating electric field a second harmonic is generated in the nonlinear optical thin film waveguide 5. Particularly due to the field enhancement effect, the second harmonic is generated at extremely high efficiency.

The generated second harmonic is propagated in accordance with the propagation conditions of the nonlinear optical thin film waveguide 5, and is radiated from an element surface 7.

Next, the field enhancement effect of the metal surface plasmon, which is the essential point of the invention, will be described.

When an electromagnetic wave is irradiated on a metal thin film, plasma in which the conduction electrons and positive ions in the metal are in an ionized state is induced if the frequency and the propagation constant are equal. In an ionized system called plasma, if the equilibrium of charge distribution is disturbed, a collective motion of electrons occurs to maintain electrical neutrality, thus causing oscillation of longitudinal waves. This oscillation is called the plasma oscillation. There is also a wave called surface plasma oscillation, other than this plasma oscillation (volume plasma oscillation). The electric field produced by the surface plasma oscillation has a periodic wave motion in the directions along the metal surface, decreasing exponentially in the direction perpendicular to the metal surface. The relationship between the upper limit $\omega s$ of the angular frequency of the surface plasma oscillation and the lower limit $\omega p$ of the angular frequency of the volume plasma oscillation is given by $$\omega s = \omega p/\sqrt{2}$$

where
$\omega s$: the upper limit value of the angular frequency of the surface plasma oscillation
$\omega p$: the lower limit value of the angular frequency of the volume plasma oscillation The metal surface plasmon mentioned above is obtained through quantization of the collective motion of electrons causing the above-described excited surface plasma oscillation. The energy of the metal surface plasmon with angular frequency $\omega$ is expressed as $\hbar\omega$.

Dispersion of the surface plasmon is generally determined by the permittivities of the metal and the dielectric contacting the metal. Dispersion of the surface plasma wave deriving from the interface of the metal and the dielectric alone is given below:

$$k^{SP}(\omega) = \frac{\omega}{c}\left(\frac{\epsilon m(\omega)\epsilon(\omega)}{\epsilon m(\omega) + \epsilon(\omega)}\right)^{\frac{1}{2}}$$

where
$k^{SP}(\omega)$: the propagation constant of the metal surface plasmon
$\omega$: the angular frequency of the metal surface plasmon
$\epsilon m(\omega)$: the relative complex permittivity of the metal ($\epsilon m = \epsilon'm + i\epsilon''m$)
$\epsilon(\omega)$: the relative permittivity of the dielectric Since the permittivity of the metal is $\epsilon'm < 0$, the relationship $|\epsilon^2 m| > \epsilon$ should stand so as for the real part of $k^{SP}(\omega)$ (representing the propagation constant) to take a positive value. Further, to suppress the attenuation of the surface plasma oscillation (reduce $Im(k^{SP}(\omega))$) and increase the field enhancement effect, it is necessary to select a metal of which $|\epsilon'm|$ is large and $\epsilon''m$ is small. As metals to be actually used, precious metals such as silver, gold, copper, etc. meet the conditions. Silver, in particular, exhibit good characteristics.

In connection with the kinds of metals to be used, the imaginary part $Im(k^{SP}(\omega))$ of the wave number determining the attenuation of the surface plasmon can be approximately expressed as follows.

$$Im(k^{SP}(\omega)) \approx \frac{\omega}{c}\left(\frac{\epsilon m'\epsilon}{\epsilon m' + \epsilon}\right)^{2/2}\frac{\epsilon m''}{2\epsilon m'^2}$$

where
$\epsilon$: the relative permittivity of the dielectric
$\epsilon m'$: the real part of the relative complex permittivity of the metal
$\epsilon m''$: the imaginary part of the relative complex permittivity of the metal Accordingly, it can be concluded that a metal having a smaller $|\epsilon m''/\epsilon m'^2|$ value has a smaller propagation loss of light. By way of example, values of $|\epsilon m''/\epsilon m'^2|$ of various metals for 1.1 eV light (wavelength: 1.127 $\mu$m) are given in the following table.

| Metal | $\|\epsilon m''/\epsilon m'^2\|$ | |
|---|---|---|
| Ag | $1.11 \times 10^{-3}$ | ⎫ |
| Au | $1.26 \times 10^{-3}$ | Metals capable of generation of surface plasmon |
| Cu | $1.43 \times 10^{-3}$ | ⎭ |
| Al | $1.75 \times 10^{-3}$ | |
| Ir | $29.5 \times 10^{-3}$ | |
| Pt | $83.4 \times 10^{-3}$ | |
| Os | $116 \times 10^{-3}$ | |
| W | $500 \times 10^{-3}$ | |

From the results it follows that metals approximately satisfying $|\epsilon m''/\epsilon m'^2| < 2 \times 10^{-3}$ are desirably used.

By comparing the above formula concerning the dispersion of the surface plasmon with the following formula of the propagation constant of light, $$k(\omega) = \omega\sqrt{\epsilon(\omega)}\sin(\theta)/c$$

where
$k(\omega)$: the propagation constant of light
$\theta$: the incident angle it follows that the real part of the propagation constant of the surface plasma is greater than that of light throughout the entire region of angular frequency [$Re(k^{SP}(\omega)) > k(\omega)$], therefore the surface plasmon is a non-radiative electromagnetic wave. Consequently, no surface plasmon can be excited with light ray; in order to excite the surface plasmon, the use of an evanescent wave with a propagation constant greater than that of light is needed. To change the propagation constant, a method using a diffraction grating, as well as a method using the total reflection at the bottom surface of a prism having a large refractive index, may be employe. The present invention is not to limit the method of changing the propagation constant to be employed.

Since the surface plasmon is a non-radiative electromagnetic wave, the electromagnetic wave energy is confined to a very narrow region (a depth equivalent approximately to several to one wavelength) near the metal interface. Consequently, the amplitude of the electric field near the interface between the metal and the dielectric layer, particularly, amplitude of the electric field having a vector perpendicular to the metal surface, is increased. This phenomenon is called the electric field enhancement effect. By optimizing the structure of a multilayer film, it is possible to obtain an electric field amplitude several tens of times the intensity of the incident light. This is equal to the case in which the incident light intensity is increased approximately several hundreds to a thousand of times. This is especially effective in reduction of element size and application to low-power lasers. Since the field enhancement effect is conspicuous for the electric field where polarization is perpendicular to the metal surface, a greater nonlinear effect can be obtained by machining a nonlinear optical crystal such that the nonlinear polarization axis thereof is oriented perpendicular to the metal surface.

In the case of the film thickness d of the metal thin film 4 being of the order of several hundreds of angstroms, there occurs a hybridization of plasma modes at the two, upper and lower interfaces. The propagation constant $k^{SP}(\omega)$ is given in this case by the following equation.

$$\frac{(a_m(\omega)\epsilon_1(\omega) + a_1(\omega)\epsilon_m(\omega))(a_m(\omega)\epsilon_2(\omega) + a_2(\omega)\epsilon_m(\omega))}{(a_m(\omega)\epsilon_1(\omega) - a_1(\omega)\epsilon_m(\omega))(a_m(\omega)\epsilon_2(\omega) - a_2(\omega)\epsilon_m(\omega))} = \exp(-2a_m(\omega)d) \quad (1)$$

where
$a_1 = \{k^{SP}(\omega)^2 - (\epsilon_1(\omega)\omega^2/C^2)\}^{\frac{1}{2}}$
$a_2 = \{k^{SP}(\omega)^2 - (\epsilon_2(\omega)\omega^2/C^2)\}^{\frac{1}{2}}$
$a_m = \{k^{SP}(\omega)^2 - (\epsilon_m(\omega)\omega^2/C^2)\}^{\frac{1}{2}}$
$\epsilon_1$: the relative permittivity of the dielectric 3;
$\epsilon_2$: the relative permittivity of the nonlinear optical thin film 5;
d: the thickness of the metal thin film 4.

As is clear from the above formula, the state of dispersion can be changed by adjusting the thickness d of the metal thin film 4.

The phase matching conditions for the nonlinear optical element according to the present invention will be described.

When light is introduced to the element of the present invention and a surface plasmon with an angular frequency of $\omega$ is generated, a second harmonic having an angular frequency of $2\omega$ is generated in the interior of the nonlinear optical thin film waveguide 5 contacting the metal. The second harmonic generated is propagated in accordance with the propagation mode of the nonlinear optical thin film waveguide 5. Therefore, the phase matching conditions for the element of the invention reside in that the propagation constant $k^{SP}(\omega)$ should coincide with the propagation constant $k^{WG}(2\omega)$ of $2\epsilon$ light propagated through the nonlinear optical thin film waveguide 5. The propagation constant of the surface plasmon is determined by the refractive indices of the dielectric 3, metal thin film 4 and nonlinear optical thin film waveguide 5, and the film thickness d of the metal thin film 4, as defined in the above formula. The propagation constant $k^{WG}(2\omega)$ of the waveguide is expressed as follows.

$$a_2(2\omega)T = (m + 1)\pi - atan\frac{\epsilon_3(2\omega)a_2}{\epsilon_2(2\omega)a_3} - atan\frac{\epsilon_1(2\omega)a_2}{\epsilon_2(2\omega)a_1} \quad (2)$$

where
$a_1 = \{k^{WG}(2\omega)^2 - (\epsilon_1(2\omega)4\omega^2/C^2)\}^{\frac{1}{2}}$
$a_2 = \{k^{WG}(2\omega)^2 - (\epsilon_2(2\omega)4\omega^2/C^2)\}^{\frac{1}{2}}$
$a_3 = \{k^{WG}(2\omega)^2 - (\epsilon_3(2\omega)4\omega^2/C^2)\}^{\frac{1}{2}}$
$\epsilon_1$: the relative permittivity of the dielectric 3
$\epsilon_2$: the relative permittivity of the nonlinear optical thin film waveguide 5
$\epsilon_3$: the relative permittivity of the dielectric 6
T: the depth of the nonlinear optical thin film waveguide 5;
m: mode number (integer not smaller than 0)

Accordingly, the propagation constant of the nonlinear thin film waveguide 5 is determined by the refractive indices of the dielectrics 3 and 6 and nonlinear optical thin film waveguide 5, and the waveguide depth T.

Figure 2A:
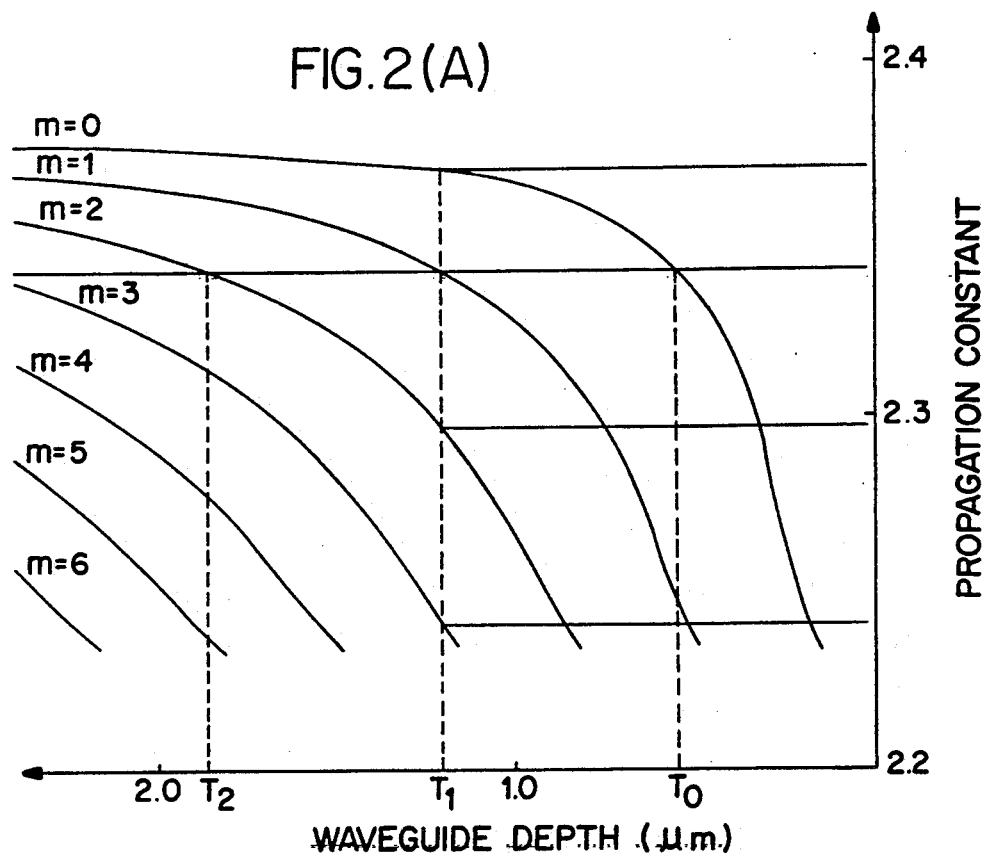
FIGS. 2(A) and 2(B) are diagrams schematically showing the phase match condition of FIG. 1.
Figure 2B:
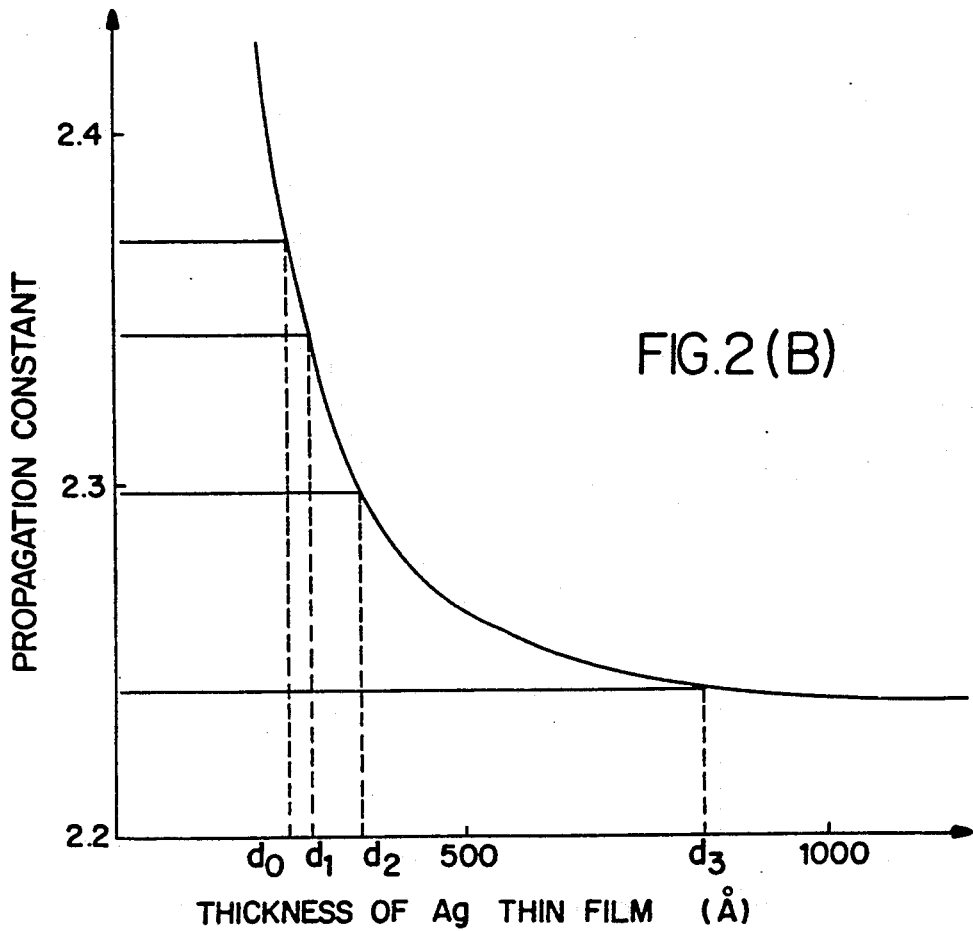

By equating these equations, it is possible to select the parameters T and d. FIG. 2 illustrates the relationship of the parameters T and d in the case of using a LiNbO$_3$ proton exchange waveguide, as an example of the arrangement of the present invention. The arrangement of the invention permits a relatively free selection of T and d, which is extremely advantageous in satisfying the phase matching conditions, as compared to a mode coupling SHG element in which the waveguide parameters can be selected only discretely. Since a sequential selection of the phase matching conditions is permitted, an optical test can be conducted after the layer of either the metal thin film 4 or the nonlinear optical thin film waveguide 5 is formed and thereafter the other layer can be formed in accordance with the optical constant of the previously formed layer, whereby the yield of the elements can be improved. More specifically, when the waveguide is formed first in the manufacture of the element, a waveguide 5 with a depth ranging from $T_{min}$ to $T_{max}$ is formed (for example, a waveguide depth of $T_1$, for the sake of explanation), then a metal thin film 4 with a thickness $d_0$, $d_1$, $d_2$, or $d_3$ corresponding to $T_1$ has only to be formed on the waveguide 5. On the contrary, in the case of forming first a thin film 4 with a thickness of $d_1$, a waveguide 5 with a depth of $T_1$, $T_2$ or $T_3$ corresponding to the film thickness has only to be formed. Sequential selection of the phase matching conditions, described as above, permits an optical test to be conducted after the layer of the thin film 4 or waveguide 5 is formed and thereafter form the other layer in accordance with the optical constant of the previously formed layer. This is advantageous in improving the yield of the elements.

In the optical harmonic generator of the present invention, the surface plasmon is an electromagnetic wave having no radiative property, and accordingly, the fundamental wave cannot, in principle, be propagated through the waveguide. Since the fundamental wave is prevented from being propagated outside the element, it is not necessary to provide a filter or the like and thus the element can be made small in size.

Now, the present invention will be described with reference to examples.

EXAMPLE 1

A Nd:YAG laser beam with a wavelength of 1064 nm was used as the fundamental wave laser beam 1, a GaP prism with a refractive index of 3.1090 as the prism 2, an air layer with a thickness of about 100 Å and a refractive index of 1.0003 as the dielectric 3, a silver thin film with a refractive index of $0.234 + 7.14i$ as the metal thin film 4, and a LiNbO$_3$ proton exchange waveguide with a waveguide depth T of 4 $\mu$m (refractive indices of the waveguide part: 2.2583 at 1064 nm, 2.3970 at 532 nm; refractive indices of the substrate part: 2,1557 at 1064 nm, 2.2341 at 532 nm) as the nonlinear optical thin film waveguide 5. From theoretical calculation the thickness d of the silver thin film should be appropriate values ranging from 350 Å to 600 Å. An optical harmonic generator was actually produced by use of a silver thin film with a film thickness d of 400 Å, and when the fundamental wave laser beam 1 was made to enter the prism 2 at an angle corresponding to the propagation constant 2.338, light with a wavelength of 532 nm was emitted from the element surface 7.

EXAMPLE 2

A Nd:YAG laser beam with a wavelength of 1064 nm was used as the fundamental wave laser beam 1, a TiO$_2$ prism with a refractive index of 2.4805 as the prism 2, an air layer with a thickness of about 100 Å and a refractive index of 1.0003 as the dielectric 3, a silver thin film with a refractive index of $0.234 + 7.14i$ as the metal thin film 4, and a MNA (2-methyl-4-nitroaniline) thin film with refractive indices of 2.093 at 1064 nm and 2.485 at 532 nm and a waveguide depth T of 2 $\mu$m as the nonlinear optical thin film waveguide 5. From theoretical calculation the film thickness d of the silver thin film should be appropriate valves ranging from 350 Å to 450 Å. An optical harmonic generator was actually produced using a silver thin film with a film thickness d of 400 Å, and when the fundamental wave laser beam 1 was made to enter the prism 2 at an angle corresponding to the propagation constant 1.780, light with a wavelength of 532 nm was emitted from the element surface 7.

In this invention, first of all, the propagation constant of the surface plasmon with angular frequency $\omega$ and that of light with angular frequency $2\omega$ propagated through the nonlinear optical thin film waveguide need to be equal to each other.

The parameters T and d can be obtained using the equations (1) and (2), as mentioned above. It is then necessary to determine in advance the values $\epsilon_1$, $\epsilon_2$, $\epsilon_3$, and $\epsilon_m$. The value $\epsilon_m$ is set to such a value that the field enhancement effect is obtained, as described above, whereas the values $\epsilon_1$, $\epsilon_2$ and $\epsilon_3$ are individually set to such values that the relationship $\epsilon_2 > \epsilon_1$, $\epsilon_3$ is fulfilled, in order to guide light to the nonlinear optical thin film waveguide.

As the material for the nonlinear optical thin film waveguide 5, other than those mentioned in the above EXAMPLES 1 and 2, any materials having a nonlinear optical characteristic (and, in general, a permittivity of not smaller than 1.5), for example, GaSb, GaAs, N-(4-nitrophenyl)-(L)-prolinol, PbTiO$_3$, Ba$_2$NaNb$_5$O$_{15}$, 3-methyl-4-nitropyridine-1-oxide, Sr$_{0.5}$Ba$_{0.5}$Nb$_2$O$_6$, BaBO$_3$, etc., can be used.

For the dielectric 3, it is possible to use glass (permittivity: about 1.5), A N (permittivity: about 2), etc., except for the aforementioned material.

It is then necessary to set the wave number of the evanescent wave to be coincident with the propagation constant of the surface plasmon with angular frequency $\omega$ or of light with angular frequency $2\omega$, determined as above.

In the case of using a prism as the optical component, the wave number vector k of the evanescent wave is given by $$k = \omega/c \times n \times \sin\theta$$

(n: the refractive index of the prism) and accordingly can be adjusted by selecting the refractive index of the prism and the angle of the incident light.

The above-described examples use incident light with a wavelength of 1064 nm and a Nd:YAG laser as the light source, but the present invention is not limited to these conditions. For example, a laser using a III-V group semiconductor or a gas laser may be used, and by doing so, different wavelengths can be selected for the incident light.

The wave number of the evanescent wave, the propagation constant of the metal surface plasmon, and the propagation constant of light propagated through the waveguide are all dependent on the refractive index, while the refractive index of a material becomes greater when light with a smaller wavelength is incident to the material. Therefore, it is necessary to select the most suitable materials for the arrangement of the invention, depending on the wave number of the incident light, in other words, the wavelength of light to be emitted.

As the optical component for emitting light having a propagation constant greater than that of the incident light, the foregoing examples use a prism capable of generating an evanescent wave, but the present invention is not limited to this and a diffraction grating may be used instead.

In the foregoing, generation of the second harmonic alone is explained by way of example. To generate the Nth (N=3, 4, ...) harmonic, the corresponding propagation constant of the nonlinear thin film waveguide 5 (corresponding to the equation (2)) is obtained and then is equated with the equation (1), whereby it is possible to select the parameters for the depth T of the nonlinear thin film waveguide 5 and the thickness d of the metal thin film 4. By following this procedure, the Nth harmonic can be generated satisfactorily.

As described above, the present invention can provide an optical harmonic generator which is simple in structure and small-sized, yet it has high harmonic generation efficiency.

Further, the present invention makes it easy to meet the phase matching conditions and enables the use of materials that cannot be adjusted in bulk to satisfy the phase matching conditions.

What is claimed is:
1. An optical harmonic generator comprising:
   an optical component for emitting light having a propagation constant greater than that of incident light;

a metal thin film in which a surface plasmon is excited by the light emitted from said optical component; and a waveguide including a nonlinear optical thin film for emitting, from an end face thereof, light with a wavelength which is 1/N (N: integer equal to or larger than two) of the incident light wavelength, by the surface plasmon of said metal thin film wherein the thickness of said metal thin film and the depth of said waveguide are selected such that the propagation constant of said surface plasmon of said metal thin film is coincident with the propagation constant of the light having the 1/N wavelength with respect to the incident light wavelength and propagating through said waveguide.

2. The optical harmonic generator according to claim 1, wherein a first dielectric is interposed between said optical component and said metal thin film.

3. The optical harmonic generator according to claim 2, wherein a second dielectric is arranged on a side of said waveguide opposite to said metal thin film.

4. The apparatus of claim 1 wherein a dielectric is arranged on a side of said waveguide opposite to said metal thin film.

5. A frequency conversion apparatus comprising a laser beam source;
an optical harmonic generator including an optical component for emitting light having a propagation constant greater than that of incident light;
a metal thin film in which a surface plasmon is excited by the light emitted from said optical component; and
a waveguide including a nonlinear optical thin film for emitting, from an end face thereof, light with a wavelength which is 1/N (N: integer equal to or larger than two) of the incident light, by the surface plasmon of said metal thin film;
wherein the thickness of said metal thin film and the depth of said waveguide are selected such that the propagation constant of said surface plasmon of said metal thin film is coincident with the propagation constant of the light having the 1/N wavelength with respect to the incident light wavelength and propagating through said waveguide.

6. The frequency conversion apparatus according to claim 3, wherein said laser beam source comprises a solid state laser.

7. The frequency conversion apparatus according to claim 5 wherein said laser beam source comprises a semiconductor laser.

8. The frequency conversion apparatus according to claim 5, wherein said laser beam source comprises a gas laser.

9. An optical harmonic generator comprising:
an optical component for emitting light having a propagation constant greater than that of incident light;
a metal thin film in which a surface plasmon is excited by the light emitted from said optical component;
a waveguide including a nonlinear optical thin film for emitting, from an end face thereof, light with a wavelength which is an integral measure of a frequency of the incident light, by the surface plasmon of said metal thin film;
a first dielectric interposed between said optical component and said metal thin film; and
a second dielectric arranged on a side of said waveguide opposite to said metal thin film.

10. An optical harmonic generator comprising:
an optical component for emitting light having a propagation constant greater than that of incident light;
a metal thin film in which a surface plasmon is excited by the light emitting from said optical component;
a waveguide including a nonlinear optical thin film for emitting, from an end face thereof, light with a wavelength which is an integral measure of a frequency of the incident light, by the surface plasmon of said metal thin film; and
a dielectric arranged on a side of said waveguide opposite to said metal thin film.

11. An optical harmonic generator comprising:
an optical component for emitting light having a propagation constant greater than that of incident light;
a thin metal film in which a surface plasmon is excited by the light emitted from said optical component; and
a waveguide including a nonlinear optical thin film for emitting, from an end face thereof, light with a wavelength which is an integral measure of a frequency of the incident light, by the surface plasmon of said thin metal film.

12. A frequency conversion apparatus comprising:
a laser beam source;
an optical harmonic generator including an optical component for emitting light having a propagation constant greater than that of incident light, a thin metal film in which a surface plasmon is excited by the light emitted from said optical component; and
a waveguide including a nonlinear optical thin film for emitting, from an end face thereof, light with a wavelength which is an integral measure of a frequency of the incident light, by the surface plasmon of said metal thin film.

* * * * *